United States Patent [19]

Nafisi-Novaghar et al.

[11] Patent Number: 5,164,212
[45] Date of Patent: Nov. 17, 1992

[54] METHOD FOR COLORING FRUITS AND VEGETABLES WITH ANTHRAQUINONES AND PRODUCT

[75] Inventors: Karim Nafisi-Novaghar; Dorothy K. Keefer, both of Walnut Creek; Jurgen H. Strasser, Lafayette, all of Calif.; Lowell V. Dravenstadt, Duxbury, Mass.; Russell A. Lem, Concord, Calif.

[73] Assignee: Del Monte Corporation, San Francisco, Calif.

[21] Appl. No.: 748,847

[22] Filed: Aug. 23, 1991

[51] Int. Cl.⁵ .............................................. A23L 1/275
[52] U.S. Cl. ................................... 426/250; 426/540; 525/282; 525/375; 546/70
[58] Field of Search .................. 426/250, 540; 546/76; 525/282, 375

[56] References Cited

U.S. PATENT DOCUMENTS

| | | | |
|---|---|---|---|
| 4,156,023 | 5/1979 | Jessen et al. | 426/250 |
| 4,167,422 | 9/1979 | Bellanca et al. | 426/250 |
| 4,201,794 | 5/1980 | Sumitani | 426/250 |
| 4,206,240 | 6/1980 | Bunes | 426/250 |
| 4,258,189 | 3/1981 | Wang et al. | 426/250 |
| 4,263,333 | 4/1981 | Mainz et al. | 426/540 |
| 4,316,918 | 2/1982 | Bunes | 426/540 |
| 4,442,104 | 4/1984 | Wedral | 426/250 |
| 4,442,105 | 4/1984 | Wissgott | 426/250 |

FOREIGN PATENT DOCUMENTS 238671 4/1971 Japan.

OTHER PUBLICATIONS

Donkin, R. A., "The Insect Dyes of Western and West-Central Asia", in *Anthropos*, Ed. Schmidt, W. and Thiel, J. F., publ. Anthropos-Institut, St. Augustin, Germany; vol. 72 (1977) pp. 847-880.
Beavers, D. V., et al., *Food Technology*, 23, 175 (1969).
Kiel, E. G., et al., *J. Soc. Dyers, Col.* 79, 21 (1963a).
Kiel, E. G., et al., *J. Soc. Dyers, Col.* 79, 62 (1963b).
Meloan, S. N., et al., *Histochemie* 37, 87 (1971).
Tri Valley Growers, press release, Feb. 2, 1990; Natural Color Developed for Fruit Cocktail Cherries; 1 page.

*Primary Examiner*—Jeanette Hunter
*Attorney, Agent, or Firm*—Flehr, Hohbach, Test Albritton & Herbert

[57] ABSTRACT

A method for permanently coloring fruits (cherries) and vegetables using carmine and other anthraquinones, using mixtures of multivalent metal ions and acid. The cherries are infused with a mixture of calcium ions, other multivalent metal ions, and carmine dye, at a pH at which the carmine is in soluble form. The cherries are then infused with an acidification solution which results in the preciptation of an insoluble carmine-metal ion complex within the cherries. Unused dye is treated and recycled.

15 Claims, 2 Drawing Sheets

FIG._1

METHOD FOR COLORING FRUITS AND VEGETABLES WITH ANTHRAQUINONES AND PRODUCT

FIELD OF THE INVENTION

The present invention in all of its associated aspects is directed to a method for coloring fruits and vegetables (e.g. cherries) with anthraquinone pigments such as carmine.

BACKGROUND OF THE INVENTION

Dyes and coloring agents have been used for a variety of purposes throughout history. For example, green copper salts extracted from mines were used as an eye shadow by the Egyptians as early as 5000 B.C. Similarly henna was and is still used as a hair and fingernail colorant in the Middle East, Asia and other parts of the world. A variety of plant and animal dyes were used to dye textiles, and certain colors were valued more highly than others. See R. A. Donkin, The Insect Dyes of Western and West-Central Asia, Anthropos, Herausgeber Anthropos-Institut, 5205 St. Augustin, Deutschland. Vol. 72 1977. Currently, colors are used extensively in textiles, foods, drugs and cosmetics.

The coloring of foodstuffs and condiments dates back at least 500 years. In general, colors are added to food products to improve appearance. Some food producers believe that the color of a food product is more influential with consumers than its flavor. To consumers, off-color foods mean inferior products. Additionally, color may be added to make a food recognizable or to compensate for color loss during food processing.

Until the middle of the nineteenth century, most of the colorants used in food, drugs and cosmetics were from natural sources.

One problem with the natural pigments found in plants or animals is their relative instability. Changes or deviation from natural conditions of these products can bring physical and chemical changes to the color of these products. These factors can include pH alterations or the effect of light or temperature, particularly in the thermal processing necessary to preserve some products over an extended period of time such as two to three years.

A good example of this instability is the class of anthocyanin pigments found in cherries. These pigments are not totally fixed to the fruit, and are additionally susceptible to thermal degradation during canning. Therefore, when mixed with other fruits as in a fruit cocktail, the cherries will bleed and color the syrup and other fruits in the cocktail mixture. After heat treatment, the pigments can fragment and lose their original color, thus resulting in a discolored mixture. As a result, cherries to be used in other products are generally bleached of their natural color and redyed using a more stable dye. Bleaching is usually accomplished by the use of sulfur dioxide, which is then removed with a sodium chlorite solution. Beavers and Payne, Food Technology 23, 175 (1969). Alternatively, the sulfur dioxide may be removed by boiling the cherries.

The instability of these pigments led to the development of synthetic colors. The first synthetic dye was synthesized by a British chemist in 1856. Addition of the first synthetic dye to foods was allowed first for dairy products in the United States; colors were allowed in 1886 for butter and in 1896 for cheese. By the year 1900, synthetic colorants were used in a wide range of foods such as ice cream, candy, ketchup, jellies, noodles, wine and many more.

The effect of synthetic colorants on human health was first recognized in the 1950s, when animal studies were conducted that implicated some colorants as health concerns. As a result, some colorants are no longer permitted in food.

Of particular interest to the present invention is the status of red colors allowed in foods. Within the last thirty years at least four different FD&C Red colors have been delisted by the U.S. Government and are no longer permitted in food.

FD&C Red No. 3 is a Xanthene dye with a range of application from lipstick to candy to dyed cherries. It has a maximum absorbency wavelength at about 520 nm, and is chemically very stable. It precipitates under acidic conditions. However, in January of 1990, the Food and Drug Administration announced the formal banning of FD&C Red No. 3 in cosmetics, based on the required compliance with the Delany Clause of the Food, Drug and Cosmetic Act. This ban, however, does not yet disapprove "permanently" listed uses of the food dye from ingested drugs and foods.

FD&C Red No. 40 will color cherries, but will bleed if the cherries are washed since it doesn't precipitate; this can cause discoloration in cherry ice cream or the pears or syrup in a fruit cocktail mixture. Thus safe but stable alternatives are needed to replace the use of FD&C Red No. 3 in foods.

Carmine is a natural deep red pigment which is approved for use in foods in the United States. The coloring agent in carmine is carminic acid, which is a natural anthraquinone dye. The source of carminic acid is cochineal, which is derived from female insects (Coccus cacti) that live on a particular species of cactus, Nopalea coccinelliferna. The female insects are collected just prior to egg-laying, since the highest concentration of cochineal is in the egg yolks. After the insects are dried and ground, they can be used as is or processed to produce a water soluble cochineal extract or carmine.

Since carmine, cochineal and carminic acid are from the same origin, the word "carmine" will be used to designate any of these three.

The use of carmine in the coloring of food has not been extensive due to the cost of the pigment. Carmine is the most heat stable of the natural red pigments. It also precipitates under acidic conditions. However its use has generally been confined to a utilization of the water soluble form to uniformly color a product, or to produce water soluble sugar syrups that can be used to color foods (Japanese Patent No. 2 386/71) or other products, because of its tendency to bleed. The use of carmine to dye cherries used in fruit cocktail has been previously reported; however the process utilized and the resulting stability of the color are unknown. Tri Valley Growers press release.

Structurally, carmine is similar to other anthraquinones such as alizarin, erytholaccin, deoxyerythrolaccin, laccaic acid, kermesic acid and its isomer ceroalbolinic acid. Of these, only laccaic acid, which is the principal coloring agent of lac dye, is currently used as a dye, although all are chromophores. Lac dye is widely used in Asia and in particular Japan, but is not approved as a food colorant in the U.S.

Anthraquinones are known to form insoluble metal complexes with multivalent metal ions. Commonly, anthroquinones form chelates with metal ions. For example, alizarin is known to form insoluble metal chelates with aluminum and calcium ions to form a dye known as "Turkey Red", a historically important textile dye. Kiel et al. J. Soc. Dyers, Col. 79, 21 (1963a). Alizarin may also form metal complexes with potassium, sodium, tin, iron and chromium ions as well. Kiel et al. J. Soc. Dyers, Col. 79, 62 (1963b). Carmine also forms these insoluble chelate complexes with metal ions, see FIG. 1. Meloan et al. Histochemie 37, 87 (1971).

Calcium ions also are known to play an important part in cellulosic food processing since calcium is a firming agent and increases the thermal tolerance of these foods during thermal processing.

SUMMARY OF THE INVENTION

It is a general object of the invention to produce an acceptable substitute method for permanently coloring fruits and vegetables.

It is a further object of this invention to use carmine or its associated forms to color fruits and vegetables.

A further object of this invention is to provide in the above process for the conservation of carmine by recycling of the uninfused carmine dye solution.

It is an additional object of this invention to provide a method to allow the use of other anthraquinone pigments in this technology.

One aspect of the present invention is based on the discovery that cellulosic food solids, preferably fruits (e.g. cherries) and vegetables, may be permanently colored with carmine by using mixtures of metal ions in combination with acidification. This process significantly increases the stability of the carmine color of the cherries and allows said dyed cherries to be incorporated into foods without resulting in bleeding of the color into other components.

In a preferred embodiment, the dye is infused and precipitated in the form of a carmine-multivalent metal ion complex within the cellulosic food. This process is accomplished in two steps: a) an infusion of the cellulosic food solids with calcium ions, other multivalent complex-forming metal ions (e.g. aluminum, tin, iron, copper, nickel, zinc, and magnesium) and carmine dye, in any order; and, after infusion, b) acidification resulting in the precipitation of the carmine-metal ion complex within the cellulosic foods.

Suitable dyeing conditions, including dye concentration, dye pH, dye temperature and time of dyeing are chosen to minimize the physical and chemical changes in the cellulosic food solids during dyeing while allowing full penetration of the dye in soluble form into the cellulosic material.

Another aspect of the present invention is the method of recycling the unused carmine solution after dyeing. This may be accomplished by removing the calcium and other complex-forming multivalent metal ions and concentrating said carmine solution. The concentration and ion removal method may be accomplished by ultrafiltration, diafiltration or reverse osmosis techniques.

A further embodiment of this invention is the use of other anthraquinone chromophore compounds to dye cellulosic food solids such as fruits and vegetables. These other anthraquinones may be selected from the group consisting of alizarin, erytholaccin, deoxyerythrolaccin, laccaic acid, kermesic acid and its isomer ceroalbolinic acid.

All of the foregoing aspects in all of their associated embodiments that can be represented as equivalents within the skill of the relevant art are also included within the ambit of the present invention.

DESCRIPTION OF THE PREFERRED EMBODIMENTS

Figure 1:
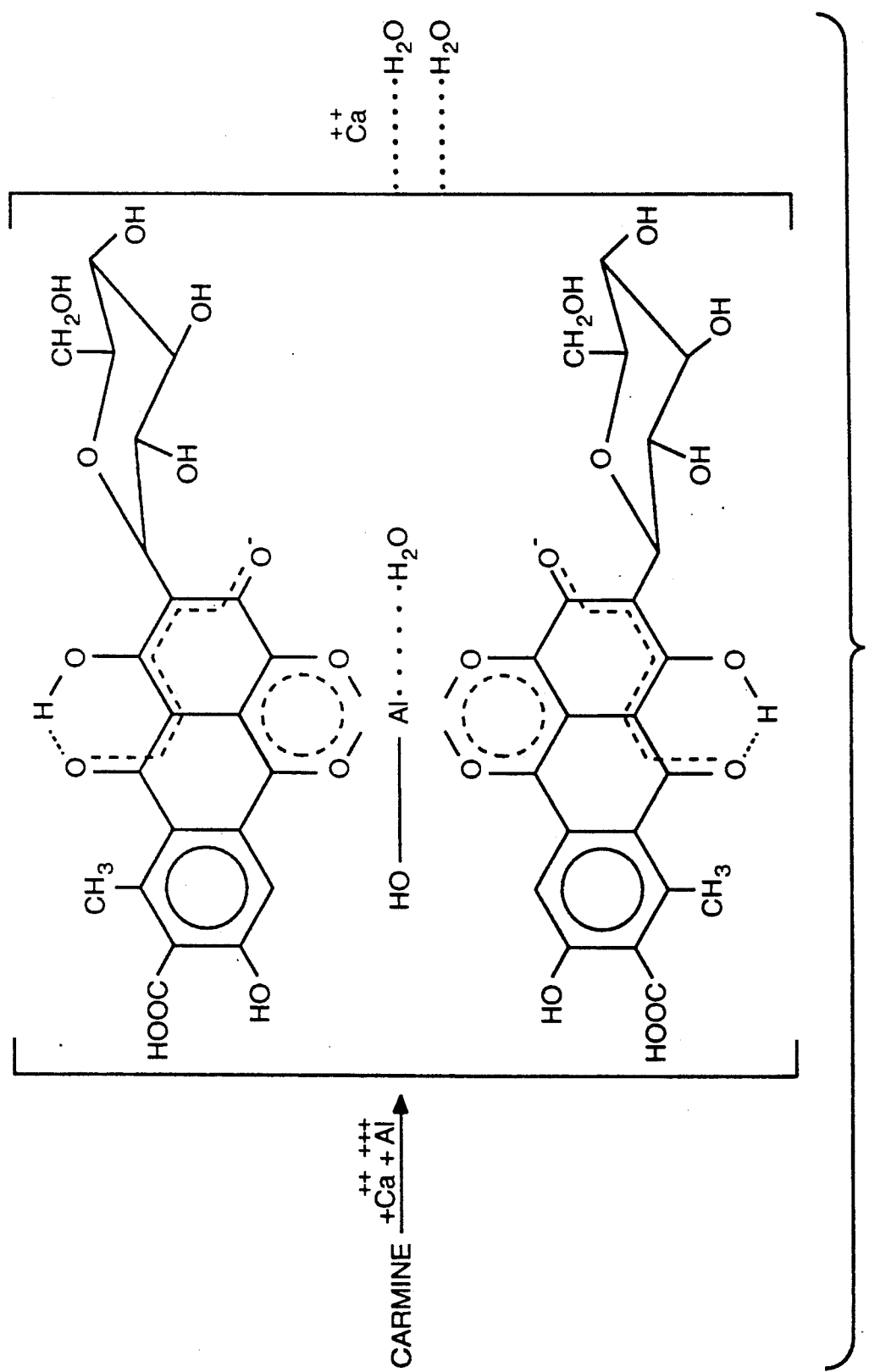
FIG. 1 is an illustration of the proposed carmine-aluminum-calcium complexation structure of Melaon et al.
Figure 2:
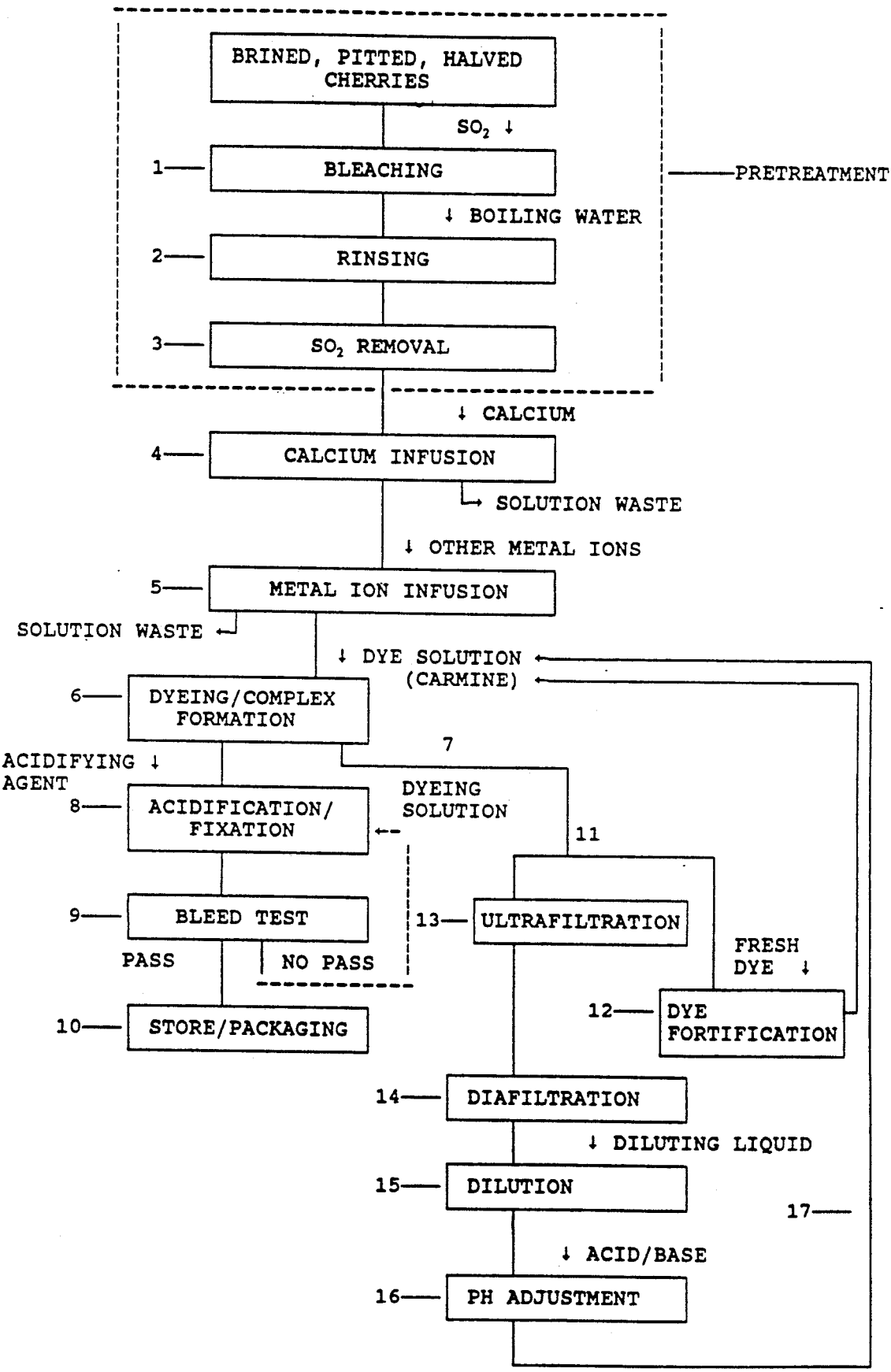
FIG. 2 is a flow chart illustrating the process of the present invention as it applies to cherries.

The present invention relates to a process for dyeing cellulosic fruits and vegetables with anthraquinone pigments. In a preferred embodiment, cherries or cherry pieces are dyed with carmine. However, the method of this invention, illustrated by the process for dyeing cherries, can be generalized to include alternative processes for other fruits and vegetables, as well as for the use of other anthraquinone pigments.

Referring to Figure Two, one embodiment of a process incorporates the present invention in which cherries or cherry pieces are dyed with carmine. A process for recycling the carmine solution for reuse is also disclosed. Steps 1–3 are pretreatment steps in which the natural pigments are bleached from the cherries. In Step 4 the cherries are infused with calcium ions, which are important in the formation of the carmine-metal ion complex. In Step 5 the cherries are infused with other metal ions important in complex formation. In Steps 6 and 7, the cherries are dyed with carmine. In Step 8 the carmine and metal ions are complexed within the cherries acidification. In Steps 11–17 the carmine dye is recovered and recycled.

In all steps, pH adjustment may be accomplished using any conventional food grade acid or base.

Step 1, prior to dyeing, the natural color of the cherries is bleached to eliminate the natural pigments which may bleed when incorporated into other products. This may be accomplished by any of the acceptable available methods, including treatment with a bleaching agent (e.g. sulfur dioxide, sodium sulfite, or sodium metabisulfite). A preferred method is treatment with sulfur dioxide at levels of 0.8 to 1.5%. Any residual color in the cherries may be removed by treating bleached cherries with sodium chlorite.

In Step 2, the bleached cherries are then conventionally rinsed with water to remove some of the sulfur dioxide.

Step 3, excess sulfur dioxide is then removed, preferably by boiling in water or an aqueous solution of citric acid or other food grade acid.

A vacuum may be applied to accelerate the removal of the sulfur dioxide, but 100% removal is not necessary. The sulfur dioxide content of the cherries may be determined by any conventional method such as the Monier-Williams method. Levels of sulfur dioxide above 350 ppm are not a problem, but may result in cherries with different shades of carmine color. The optimum level of sulfur dioxide is less than about 500 ppm.

In Step 4, the cherries are infused with calcium ions (e.g. at a concentration of 500–1000 ppm). This is important because calcium ions play a role in the formation of the carmine-metal ion complex which will precipitate in the cherries upon acidification treatment, resulting in the permanent color (to be described hereinafter). Calcium also serves as a firming agent.

The mixture may be heated for about 5-60 minutes until the cherries are completely infused with the calcium ions.

Steps 3 and 4 are preferably combined, e.g. by washing in a boiling solution of calcium ions (e.g. from a calcium chloride salt) and citric acid which serves to remove the excess sulfur dioxide.

In Step 5, the cherries are also infused with multivalent metal ions capable of forming complexes or chelates with the dye in the presence of calcium. Such metal ions are referred to herein as "other metal ions" or "other multivalent complex-forming metal ions". Suitable other metal ions include aluminum, tin, iron, copper, nickel, zinc or magnesium. These other metal ions, plus the calcium ions, allow the formation of a metal ion-carmine complex within the cherry itself, which will result in permanent coloring of the cherries after acidification. Substantially complete infusion of the cherries with the other metal ions is desirable to allow uniform coloring of the cherries.

Aluminum ion is the preferred other metal ion because of regulatory and functional reasons. A suitable form of the aluminum ion is potassium aluminum sulfate.

The other metal ion concentration may vary depending on the metal ion chosen. For aluminum ion, the concentration may range from about 2-100 ppm.

Preferably, after Step 4 the cherries are drained and then boiled in a solution of other metal ions to allow complete infusion of the cherries with the metal ions. The boiling of the cherry-metal ion mixture may be done for about 5-300 minutes.

Steps 3, 4, and 5 or 4 and 5 may be performed simultaneously or sequentially. An advantage of combining these steps is the reduction of processing time and better product integrity.

In an alternative method, Step may be performed before Step 4.

In Step 6, the solution of Step 5 is removed and the cherries are then infused with the carmine solution. A known amount of standardized aqueous carmine solution is added to the cherries. The pH, strength and temperature of the dye may be preadjusted for optimum performance purposes.

Preferably the cherries are completely covered with the aqueous dye solution so that good penetration of the dye may occur without stirring the cherries, which can be fragile.

The concentration of the carmine solution is chosen to allow good color penetration into the cherries. The concentration of the carmine solution may vary between 0.01% and 5.0% as carminic acid. The preferred concentration range is 0.05% to 1 0%, and the optimum concentration is 0.09%.

The pH of the carmine solution is chosen such that the carmine is in a soluble form and thus able to penetrate into the cherries under the dyeing conditions. Suitable pH levels of the carmine solution may be pH 7-13, with pH 8-10 being preferable. In the most preferred embodiment, the pH of the carmine solution is 8.5 to 9.5.

The cherries are left in the dye solution until substantially complete infusion of the carmine color into the cherries has occurred, with the subsequent formation of a complex in the cherries with the calcium, metal ions and carmine. The time of this dyeing step may range from 3-30 hours, with an optimum time of 5 hours at 210° F. This end point results in a substantially uniform color.

In an alternative method, Steps 4-6 may be performed simultaneously.

In Step 7, the spent dye solution is then removed. In a preferred embodiment, the carmine solution is saved for recycling and drained into a separate holding tank to be treated, as described hereinafter.

In a further embodiment, the holding tank is part of an ultrafiltration, diafiltration or reverse osmosis system.

In Step 8, the carmine-metal ion complex is precipitated within the cherries by acidification of the cherries containing the infused calcium ions, metal ions and carmine. An acidifying agent is added to the cherries.

A suitable pH range for the pH of the acidification solution is pH 2-7. A preferred pH range is 3-5, with the most preferred pH of the acidification solution being 3.9 or 4. Preferably, the pH of the fruit cocktail to which the cherries may be added is within 0.5 pH units of the acidification step.

A preferred acidifying agent is a buffered solution (e.g. citric acid and sodium citrate). Buffering serves to prevent pH fluctuation.

The mixture of cherries and solution is preferably heated to allow substantially complete infusion of the cherries with acidification solution; this allows uniform precipitation of the carmine-metal ion complex and thus uniform color of the cherries. The temperature is chosen to minimize the physical and chemical changes in the cherries while allowing full penetration of the acidification solution, e.g. a temperature of 70° F. to 220° F. The preferred temperature range for the acidification step is 150° F. to 210° F., with an optimum temperature of 210° F.

The cherries may be in the acidification solution for about 5 to 120 minutes (or more) depending on the temperature until substantially complete penetration of the acid.

The acidification step is repeated as needed until there is little or no bleeding of the color into the acidification solution or until the cherries pass the required bleed test. Typically, the cherries are washed with acidification solution 3-5 times.

Calcium salts (e.g. calcium chloride) may be also added during Step 8 to improve the texture of the cherries as needed.

In Step 9, a bleed test may be done to determine the permanency of the color. This bleed test may be designed with the final use of the cherries in mind, and may be different for different uses of the product. For cherries or cherry pieces used in fruit cocktail, the bleed test consists of cooking the cherries with pear pieces under 10 pounds of pressure for 10 minutes and observing the staining of the pears. If the cherries do not pass the bleed test, they may be retreated with the acidification solution in Step 8 as illustrated by the phantom recycle line.

In Step 10, cherries that pass the bleed test may be either stored or packaged as needed.

Step 11, the used dye solution may be reused. Specifically, the used dye solution containing the unused dye and calcium and metal ions that have leached out of the cherries may be treated in two ways, depending on the metal ion concentrations of the solution. The spent dye solution may be either fortified (Step 12) or recycled (Steps 13-17). The decision to recycle using filtration is made based on the concentration at which precipitates form in the spent dye solution; this reduces the availability of the dye to the cherries. If the metal ion concentration is low enough and there is little or no precipitate in the spent dye solution, a fortification step (Step 12) may be done. Otherwise, the spent dye solution is recycled using ultrafiltration and diafiltration (Steps 13-17).

The cutoff point of the metal ion concentration may vary depending on the metal ions used. For example, the Step 12 fortification step is done if the aluminum ion concentration is 2 ppm or less. Aluminum ion concentrations greater than 100 ppm necessitates the use of Steps 13-17. If magnesium ions are used, dye fortification is done if the magnesium ion concentration is less than 2 ppm. It is envisioned that other ions may have different cutoff levels.

Step 12: In a preferred embodiment, dye fortification is accomplished by the addition of fresh dye solution to compensate for the dye left in the cherries, and an adjustment of the pH to allow the dye to remain soluble. After fortification, the fortified dye solution is returned to the standardized dye tank of Step 6 to be used again.

In a further preferred embodiment, the amount of dye to be added to return the spent dye solution to the standardized concentration is determined spectrophotometrically, by comparison to a calibration curve prepared with a standard carmine solution with a maximum absorbance at 520 nm.

The pH is adjusted using either an acid or a base to the pH level of the standardized dye solution of Step 6.

In optional Step 13, if the parameters of Step 11 dictate that the spent dye solution must be recycled prior to returning to the standardized dye tank, the spent dye solution may be concentrated by ultrafiltration. Ultrafiltration is achieved by the concentration of the carmine molecules while removing water and ions that permeate through the membranes. The membranes, temperature and pressure of the system is chosen to maximize flow rate while minimizing dye loss to the permeate.

During ultrafiltration, the conditions are selected to minimize the loss of dye to the permeate while allowing good flow rates through the membranes. An ultrafiltration system utilizing a 2000 to 6000 molecular weight cutoff membrane, and preferably 4000, is effective for this purpose.

The concentration by ultrafiltration may be continued until the carmine concentration is within the range of 0.09% to 3.0%.

In optional Step 14, the concentrated dye solution may be diafiltered. The purpose of the diafiltration step is to remove the accumulated metal ions to minimize the formation of precipitates and thus allow the dye to be fully available to the cherries. Diafiltration is achieved by adding water to the dye solution while removing ions that permeate through the membranes.

In a preferred embodiment of the present invention, the diafiltration system utilizes membranes with a 4,000 molecular weight cutoff.

Diafiltration is continued until the concentration of the metal ions is low enough to avoid precipitate formation. This in turn depends on the ions used; it may be different for different ions. For example, if aluminum ions are used, diafiltration continues until the aluminum ion concentration is less than 30 ppm.

In optional Step 15, after concentration and ion removal, the dye must be diluted to the standardized concentration of Step 6. This is done by determining the concentration of the diafiltered solution and adding water to bring the diafiltered solution to the desired concentration.

The concentration of the diafiltered dye solution may be determined spectrophotometrically, by comparison to a calibration curve constructed using standardized carmine solutions.

The dye solution may be adjusted using a concentrated solution of carmine to the standardized concentration.

In Step 16, the pH of the diafiltered dye solution is typically adjusted to match the pH of the standardized dye solution of Step 6. This is accomplished using a food grade base. In a preferred embodiment, the pH is adjusted to a pH of 8.0 to 9.0.

In Step 17, the diafiltered dye solution may be returned to the standardized dye holding tank, ready to be used again.

While the invention has been described with cherries as the cellulosic food product to be dyed, it is applicable to other fruits (e.g. cranberries, apples, pineapples and grapes). Also, it is applicable to vegetables (e.g. jicama, potatoes and beets).

Definitions

The term "carmine" or grammatical equivalents refers to carmine, carminic acid or cochineal, or any form or solution thereof.

The term "multivalent complex-forming metal ions" or grammatical equivalents refers to ions that form complexes such as chelates with anthraquinones such as carmine, or other complexes with carmine and anthraquinones. Such complexes are insoluble at acidic pHs.

By the terms "carmine-metal ion complex" or "insoluble complex" or grammatical equivalents are herein meant an association of the carmine anthraquinone molecule with multivalent metal ions such as calcium and aluminium, among others. These complexes may be chelates, or structures resembling chelates. Upon treatment with acid, these carmine-metal ion complexes become insoluble.

The following example illustrates one specific embodiment of the present invention.

EXAMPLE 1

Roughly 4000 pounds of sulfited cherries were conveyed into the dyeing tank, and covered with water at 150°-200° F. The water was drained while flushing with fresh hot water for about 5 minutes. At this stage most of the surface sulfur dioxide was removed. Further treatment to remove more sulfur dioxide was done by the addition of a mixture of citric acid and calcium chloride. 8 pounds of citric acid, and 20 pounds of a 37% solution of calcium chloride were dissolved in about 5 gallons of water. This reagent solution was added into the dye tank gradually along with hot water to maximize mixing of the reagents with the hot water. The cherries were covered with this hot water-reagent solution mixture and boiled for about 30 minutes. The cherries were then flushed with hot water about 10 minutes, and the sulfur dioxide content of the cherries determined by any conventional method such as the Monier-Williams method. The water was then drained.

4 pounds of potassium alum $(AlK(SO_4)_2 \cdot 12 H_2O)$ was dissolved in 5 gallons of water, and added to the tank with roughly half the amount of water needed to cover the cherries. An additional premixture of 10 pounds of a 37% solution of calcium chloride in 5 gallons of water was made and added with another half volume of water. The cherries were thus covered with water and a mixture of potassium alum and calcium chloride; the mixture should be at a pH of 4.0-5.5. Acid or base was added accordingly to adjust the pH as necessary. The mixture was then boiled for 90 minutes to fully infuse the cherries with the salts. After boiling, the mixture was drained and the cherries flushed with cold water for 5 minutes.

After draining, standardized dye solution was added. Standardized dye was prepared from commercial liquid or powder forms by dilution to a 0.09% solution as carminic acid. The pH was adjusted to pH 8-9 and the temperature kept at 150°±10° F. Roughly 8000 pounds of standardized dye solution was used to cover the cherries completely.

After addition of the dye, the cherry-dye mixture was boiled gently for 5-6 hours or until the dye fully penetrated the cherries. The used dye was drained from the tank and pumped into a holding tank for further treatment for recycling. A water rinse of 5 seconds was added to the used dye.

Acidification was accomplished by adding 6 pounds of citric acid and 21 pounds of a 37% solution of calcium chloride, dissolved in 5 gallons of hot water, gradually along with hot water to maximize the mixing of the reagents with the hot water to cover the cherries. The cherry-reagent mixture is boiled for an hour; at the commencement of boiling the pH was tested to assure the pH was 3.0-4.0. The pH was adjusted with either food grade acids or bases as necessary. A higher pH will allow the metal-dye complex to resolubilize and wash away.

After draining, the cherries were flushed with a citric acid-sodium hydroxide solution. The solution is made with 5.5 pounds of citric acid and 0.75 pounds of a 50% solution of sodium hydroxide, dissolved in 5 gallons of water, and then added with a half volume of hot water to the tank (4000 pounds of water). An additional 21 pounds of a 37% solution of calcium chloride, premixed in 5 gallons of water, was added to the tank with another half volume of water so as to completely cover the cherries (a total of 8000 pounds). The pH of the cherry-reagent mixture was adjusted to pH 3.0-4.0 by acids or bases as needed. The mixture was then boiled for 5 minutes, and then flushed for 10 minutes with water. The tank was drained, and the acidification procedure was repeated three more times. The still warm cherries were fragile, so they were cooled with the acidification solution mixed with cold water. The cherries were then stored in a vinegar-benzoate mixture until needed.

The used dye was restandardized for use by one of two methods. If the aluminum ion concentration was below 100 ppm, the used dye solution was fortified by adding concentrated carmine and adjusting the volume and pH. First the volume was adjusted by the addition of 100-200 gallons of water. The concentration of carmine in the spent dye solution was determined spectrophotometrically using a Hewlett Packard 8452A Diode Array Spectrophotometer at 520 nm, using a calibration curve made with standardized solutions of carmine. Concentrated carmine was added in the form of a solution of about 3.5% obtained from Warner-Jenkinson, to make up a 0.09% solution. Generally 60-120 pounds of carmine solution at about 3.5% was required to adjust the concentration of 8000 pounds of carmine solution used. The pH of the fortified dye solution was adjusted to a pH of 8.0 to 9.0 using 50% sodium hydroxide solution. Generally 0.5 pounds of 50% sodium hydroxide solution is needed for 8000 pounds of carmine dye solution. The fortified dye was now standardized and was returned to the standardized dye holding tank.

If the concentration of aluminum ions in the spent dye solution was greater than 100 ppm, the dye was recycled in order to remove the excess ions. First, the spent dye solution is concentrated using ultrafiltration. A PCI Tubular pilot system using 4,000 molecular weight cutoff polysulfone composite membranes (Paterson Candy International, Ltd.) and a 5 micron prefilter was utilized. The optimum temperature was identified as 120°-150° F. and the optimum pressure as 25 bar. This resulted in a minimum amount of dye lost in the permeate. The concentration continued until the dye concentration was 0.09% to 3%, and the aluminum ion concentration was 5 to 30 ppm. At this point, the volume of the solution has decreased from 8000 gallons to 300. Diafiltration may also be done simultaneously with the concentration step.

After concentration was complete, the concentrate was then diafiltered. The diafiltration was accomplished on the same filtration system using the same membranes, temperature and pressure of the ultrafiltration system. Water was added to the concentrate at the same rate of the permeate loss, thus "washing" the concentrate with water to rid the solution of excess ions. Diafiltration continued until the aluminum ion concentration was less than 2 ppm. Diafiltration is also useful to reduce the excess sodium ions, which are detrimental to the texture of the cherries.

The volume of the solution was then adjusted such that the carmine concentration returned to 0.09% carmine. This was done using water.

Finally, the pH of the recycled dye solution was adjusted to a final pH of 8.0 to 9.0. This was accomplished using a food grade base such as sodium hydroxide. The dye was restandardized, returned to the standardized dye holding tank and ready to be reused.

What is claimed is:

1. A method for dyeing fruits or vegetables comprising the steps of
    (a) infusing the fruits or vegetables with an aqueous dye solution comprising an anthraquinone pigment at a pH level at which said anthraquinone pigment is in soluble form to cause said soluble anthraquinone pigment to penetrate into said fruits or vegetables, and
    (b) contacting said penetrated anthraquinone pigment in said fruits and vegetables with a solution of an acidifying agent one or more times, in the presence of calcium ions and other multivalent complex-forming metal ions, to lower the pH to a level at which an insoluble complex of said anthraquinone pigment is formed, thereby forming anthraquinone-dyed fruits or vegetables with no substantial bleeding of said anthraquinone pigment.

2. The method of claim 1 in which said anthraquinone pigment is carmine.

3. The method of claim 1 in which said fruits and vegetables are cherries or cherry pieces.

4. The method of claim 3 in which said cherry or cherry pieces are added to fruit cocktail.

5. The method of claim 3 in which said fruit cocktail is at a pH level within 0.5 pH units of the pH level of claim 1, step (b).

6. The method of claim 1 in which the pH level of step (a) is from about pH 7 to 13.

7. The method of claim 1 in which the pH level of step (b) is from about 2 to 7.

8. The method of claim 1 in which said other complex-forming metal ions are selected from the group consisting of aluminum, tin, iron, copper, nickel, zinc or magnesium.

9. The method of claim 1 in which said calcium ions and other complex-forming metal ions are infused into the fruits and vegetables prior to step (a).

10. The method of claim 1 in which said calcium ions and other complex-forming metal ions are infused with said soluble anthraquinone pigment into said fruits and vegetables.

11. The method of claim 1 in which step (a) is performed in a reaction vessel, wherein part of the anthraquinone solution remains at a reduced concentration in the reaction vessel, said method further compromising the steps of (c) recycling the remaining anthraquinone solution in a recycled stream, (d) concentrating the anthraquinone in said recycle stream, and (e) reducing the concentration of calcium ions and other complex-forming metal ions, if present, during recycling.

12. The method of claim 11 in which steps (d) and (e) are performed by ultrafiltration, diafiltration or reverse osmosis.

13. The method of claim 1, after step (b), in which the cellulosic food solids are boiled at a pH level at which the anthraquinone-chelate complex remains insoluble.

14. The dyed fruit or vegetable of claim 13 in which said other complex-forming metal ions are selected from the group consisting of aluminum, tin, iron, copper, nickel, zinc or magnesium.

15. A dyed fruit or vegetable comprising said fruit or vegetable having infused therein an insoluble, non-bleeding complex of an anthraquinone pigment with calcium ions and other multivalent complex-forming metal ions which provides a color to said fruit or vegetable.

* * * * *

UNITED STATES PATENT AND TRADEMARK OFFICE
CERTIFICATE OF CORRECTION

PATENT NO. : 5,164,212

DATED : November 17, 1992

INVENTOR(S) : Nafisi-Movaghar, et al.

It is certified that error appears in the above-identified patent and that said Letters Patent is hereby corrected as shown below:

On the title page of the patent, in the heading at the top of the page, and at item [75], delete "Novaghar" and insert --Movaghar--.

Signed and Sealed this

Nineteenth Day of October, 1993

Attest:

BRUCE LEHMAN

Attesting Officer

Commissioner of Patents and Trademarks